Dec. 28, 1965  H. A. HADLEY  3,226,167
WEIGHING SCALE BEARING STRUCTURE
Filed March 21, 1963
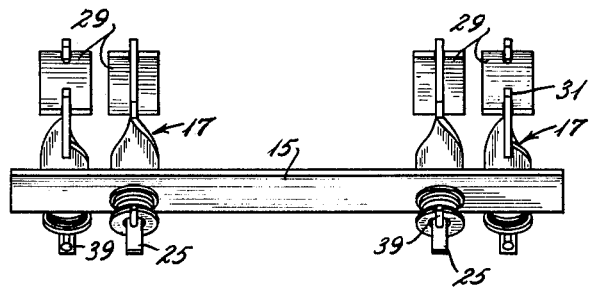
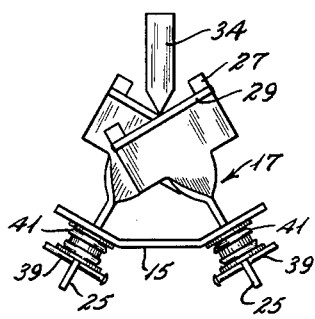
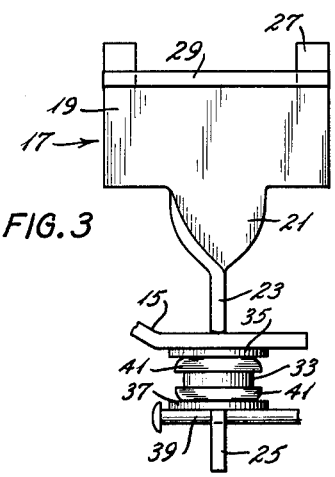
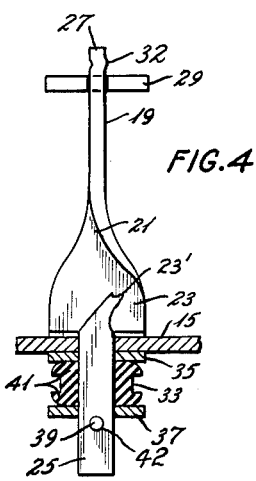
INVENTOR
HARLAN A. HADLEY
BY *Sherman & Sherman*
ATTORNEYS

United States Patent Office 3,226,167
Patented Dec. 28, 1965

3,226,167
WEIGHING SCALE BEARING STRUCTURE
Harlan A. Hadley, P.O. Box 147, Burlington, Vt.
Filed Mar. 21, 1963, Ser. No. 266,944
3 Claims. (Cl. 308—2)

This invention relates to knife-edge bearings, and relates more particularly to knife-edge bearings employed in weighing scales.

In many weighing scales, levers are supported and the forces are transmitted to and from the levers by means of knife-edge pivot and bearing assemblies in which the knife-edge pivot rests in a suitably secured bearing provided with a V-groove. The V-groove normally positions the pivot in a longitudinal plane and anti-friction plates at the end of the bearing block normally restrain the pivot from endwise motion. In practice, such pivot and bearing assemblies are not wholly satisfactory since their use leads to inaccuracies in weighing. Thus, since the V-groove must be made with a bottom having a slight radius to prevent frictional contact of the sides of the V-groove with the sides of the knife-edge pivot, the knife-edge pivot "skates" over the surface of the flattened bottom of the V-groove causing the lever to assume readily a different position for every different position of the knife-edge pivot on the radius portion of the V-groove. The movement of the pivot relative to the radius portion of the V-groove alters the pivot distances, resulting in inaccuracies in the weighing.

It is an important object of this invention to provide a novel, economical, bearing structure for a weighing scale knife-edge pivot which will be free from the above-mentioned and other disadvantages of the prior art devices.

Another object of this invention is the provision of a bearing structure wherein a plurality of bearings support the knife-edge pivot in an advantageous manner.

Still another object of this invention is to provide a sensitive bearing structure wherein independently supported bearings cooperate to form a V-bearing for supporting a knife-edge pivot and for restraining the same against lateral movement.

Other objects of this invention, together with certain details of construction and combinations of parts will be apparent from the following description when taken in conjunction with the drawing wherein:

FIGURE 1 is an elevational view showing the bearing elements of my invention mounted on a fulcrum stand;

FIGURE 2 is a side view of the apparatus shown in FIGURE 1 with the addition of a knife-edge pivot supported on the bearing elements;

FIGURE 3 is a view on an enlarged scale of one of the bearing elements illustrating in greater detail the supporting structure for the bearing elements; and FIGURE 4 is a fragmentary side view of the bearing element shown in FIGURE 3.

Referring now to the drawings wherein like numerals indicate like parts throughout the several views, and more particularly to FIGURES 1 and 2; reference numeral 15 designates a fulcrum stand of a weighing scale which stand is essentially trough-shaped as seen in side view. Four bearing holders, each generally designated by reference numeral 17 are mounted upon fulcrum stand 15. Each bearing holder 17 is preferably formed of sheet metal and includes an upper bearing support portion 19, a twisted intermediate portion 21 of reduced diameter, a base 23, and a stem 25 extending through an aperture provided in fulcrum stand 15 as will be described in detail hereinafter.

As is clearly shown in FIGURE 4, the upper bearing support portion 19 includes an upwardly projecting tab 27 at each side thereof. A flat bearing 29 has opposed slots 31 at its sides of a size to accommodate tabs 27 so that bearing 29 may be slipped into position with its lower surface resting upon the thin top surface of the bearing holder 17. Tabs 27 may be provided with ridges 32 which, while allowing bearing 29 to be slipped down into position, will prevent inadvertent removal of the bearing. Preferably, the slots in bearing 29 are slightly wider than the width of tabs 27 to enable limited play of bearing elements 29 relative to the respective bearing holder upon contact with knife-edge pivot 34 (FIGURE 2).

Twisted intermediate portion 21 of each holder imparts rigidity to the entire holder and merges at its lower end into base 23 which is disposed at right angles to bearing support portion 19.

As shown in FIGURES 3 and 4, the bottom of base 23 is rockably mounted at points 23' and the bottom sides of the base are normally spaced slightly above the upper surface of fulcrum stand 15 which constitutes the normal fixed support for the bearing holders. This spacing results from operatively positioning the base 23 with respect to the stand 15 by a resilient bushing 33 surrounding stem 25 beneath fulcrum stand 15.

The several bushings 33 are advantageously spaced from the fulcrum stand by annular washers 35. However, it will be appreciated that such spacing elements may be omitted if desired. Bushings 33 are secured to stem 25 by means of annular washers 37, upon which the bottom of bushings 33 are seated, and pins 39 extending through apertures 42 provided in respective stems 25. Of course, any equivalent securing means such as a cotter pin may be utilized to fasten bushings 33 to the stems.

In the preferred embodiment, bushings 33 consist of any suitable elastomer such as natural or synthetic rubber having the characteristics of being slightly resilient in the axial direction. If desired, integral upper and lower reinforcing rims 41 may be provided upon bushings 33 to impart the requisite degree of rigidity to the bushings while allowing limited axial resiliency.

The above-described bearing structure is effective in insuring that bearings 29 and knife-edge pivot 34 are in proper alignment since the bearings are free to move into a position where the knife-edge pivot is ideally supported. Thus, the instant arrangement of bearings and supports therefor is self-aligning.

While I have shown and described a preferred embodiment of my invention, it will be appreciated that this embodiment is to be considered merely as illustrative, and that my invention is susceptible to many changes and modification. Accordingly, it is intended to encompass all such changes and modification as fall within the spirit and scope of the appended claims.

What is claimed is:

1. A V-bearing for the knife-edge pivot of a weighing scale comprising a plurality of bearings arranged in spaced pairs, the bearings of each pair being oppositely inclined and cooperating to receive the knife-edge pivot, a holder for each bearing, relatively fixed support means for said holders, and resilient means to individually bias each of said holders downwardly to position said holders on said fixed support means.

2. A knife-edge bearing for weighing scales comprising a relatively fixed fulcrum stand provided with apertures therein, a plurality of independently supported bearings arranged in spaced pairs, the bearings of each pair being oppositely inclined and cooperating to form a V-bearing, a holder for each bearing including a base and a stem extending through a respective one of the apertures in said fulcrum stand, a resilient bushing surrounding the lower end of each stem to resiliently and individually position the bottom edge of each base with respect to said fulcrum stand, and pin means operatively engaging the bottom of said bushings for mounting said bushings upon said stems.

3. A knife-edge bearing for weighing scales comprising a trough-shaped fulcrum stand provided with apertures therein, a plurality of independently supported bearings arranged in spaced pairs, the bearings of each pair being oppositely inclined and cooperating to form a V-bearing, a rockably mounted holder for each bearing including a bearing-supporting upper portion, an intermediate twisted portion, a base, and a stem, said stem extending through a respective one of the apertures in said fulcrum stand, a resilient bushing surrounding the lower end of each stem and positioning the bottom edge of each base with respect to the fulcrum stand.

References Cited by the Examiner
UNITED STATES PATENTS

| | | | |
|---|---|---|---|
| 1,667,635 | 4/1928 | Nauss | 308—2 |
| 1,981,105 | 11/1934 | Hieher | 308—2 |
| 2,849,260 | 8/1958 | Rikken | 308—2 |
| 3,074,765 | 1/1963 | Hadely | 308—2 |

DON A. WAITE, *Primary Examiner.*
ROBERT C. RIORDON, *Examiner.*